Sept. 13, 1932.     M. S. LOWER     1,877,411
BATHING CAP
Filed Feb. 10, 1931
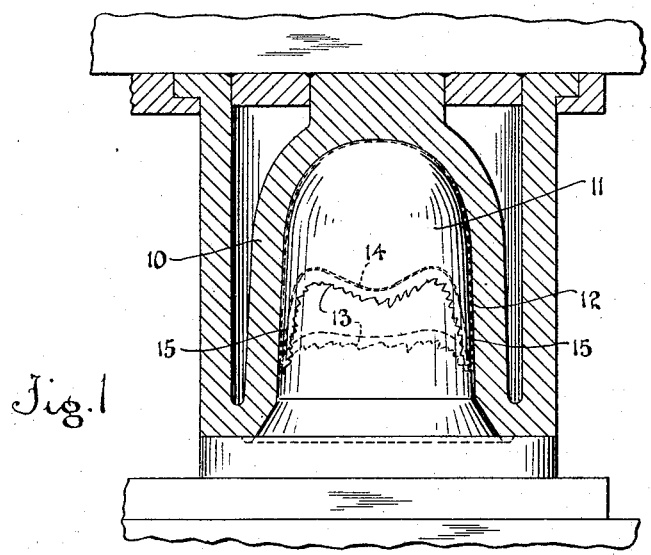
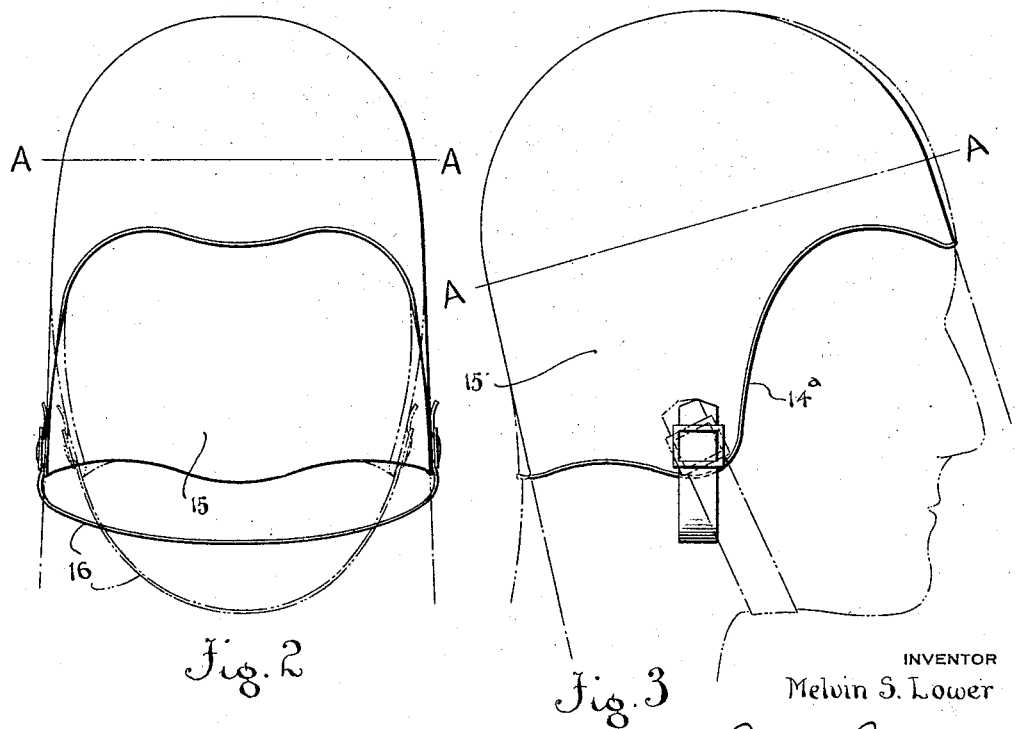
INVENTOR
Melvin S. Lower
ATTORNEYS Patented Sept. 13, 1932

1,877,411

UNITED STATES PATENT OFFICE

MELVIN S. LOWER, OF BARBERTON, OHIO, ASSIGNOR TO THE SUN RUBBER COMPANY, OF BARBERTON, OHIO, A CORPORATION OF OHIO

BATHING CAP

Application filed February 10, 1931. Serial No. 514,804.

This invention relates to elastic bathing caps of thin, flexible rubber.

Heretofore elastic rubber bathing caps have been made in two forms, one in which the cap is comparatively flat and the other in which the cap is of helmet shape. The purpose of the present invention is to provide an improved helmet-shaped cap.

One object of the invention is to provide a rubber bathing cap free of mold rind marks across the body of the cap.

Another object of the invention is to provide a bathing cap of helmet shape, but tapered outwardly toward its edge whereby much of the discomfort heretofore encountered in wearing rubber bathing caps is obviated.

The foregoing and other objects of the invention are attained in the bathing cap illustrated in the accompanying drawing and described below. It is to be understood that the invention is not limited to the specific form thereof shown and described.

Of the accompanying drawing,

Figure 1 illustrates in section a mold in which the improved bathing cap is being vulcanized;

Figure 2 is a front view of the improved cap, the full line position indicating its normal form (assuming it to be self-supporting) and the dotted line position the form it assumes when applied over the head; and Figure 3 is a side view of the improved bathing cap as applied to the head.

Referring to the drawing, the improved caps are preferably made in molds such as indicated in Figure 1 which includes a heated female mold member 10 and a heated male mold member 11 cooperating to form a cavity 12 therebetween in which rubber pieces will soften and flow by closing the mold under heat and pressure upon the rubber placed therebetween. The mold is formed with the desired design of bathing cap and excess rubber 13 is squeezed from the cavity between the mold members as a flash which is trimmed from the edge of the cap after vulcanization, the edge of the cap preferably being defined by a groove 14 forming a ridge or bead 14ª about the edge of the cap.

The mold cavity 12 tapers outwardly to the edge thereof as shown so that the ribbed edge 14ª formed upon the cap is of larger radius than the body of the cap, the portion 15 providing the part of the cap fitting over the ears and nape of the neck being of greatest radius about the axis of the mold.

The caps are made of such size as to be stretched more or less over the head. In Figures 2 and 3 the variance of the improved cap from its normal molded shape when applied on the head is shown in dash and dot lines and in comparison with the dash-dot outline of the male mold member. As best shown in Figure 3, the cap will fit tightly or be stretched most in the portion indicated by the line A—A and the reinforced or beaded edge 14ª will fit snugly but not too tightly. The portion 15 of the cap also will not fit too tightly over the ears which has been objectionable in prior forms of caps.

By forming the cap in the manner described above the only mold rind formation is that about the edge of the cap which is desirable as a reinforcement and no unsightly mold rind rib appears across the body of the cap. The improved cap may be provided with the usual chin strap 16.

Modifications of the invention may be resorted to without departing from the spirit thereof or the scope of the appended claim.

What is claimed is:—

A bathing cap of flexible, elastic rubber formed in helmet-shape for fitting to the head by stretching, and having depending side and rear portions for fitting over the ears and against the back of the neck, said cap tapering outwardly continuously from its top down to its edge all the way around the cap, said edge being reinforced by a beading of rubber thicker than the body of the cap, the body of the cap above said beaded edge being free of mold rind marks or seams, and said cap when applied having its maximum stretch distributed over a comparatively broad area on the head above said beaded edge and above said depending portions whereby the beaded edge of the cap will not embed in the skin causing discomfort to the wearer and whereby there will be a minimum of pressure of the depending portions of the cap against the ears.

MELVIN S. LOWER.